(12) United States Patent
Song et al.

(10) Patent No.: US 12,282,129 B2
(45) Date of Patent: Apr. 22, 2025

(54) GEOSTEERING INTERPRETATION USING BAYESIAN INFERENCE

(71) Applicant: Halliburton Energy Services, Inc., Houston, TX (US)

(72) Inventors: Siyang Song, Humble, TX (US); Shahin Tasoujian, Houston, TX (US); Eirik Hansen, Sola (NO); Robert P. Darbe, Tomball, TX (US); Vytautas Usaitis, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 533 days.

(21) Appl. No.: 17/696,474

(22) Filed: Mar. 16, 2022

(65) Prior Publication Data

US 2023/0296801 A1 Sep. 21, 2023

(51) Int. Cl.
*G01V 1/50* (2006.01)
*G01V 1/46* (2006.01)
(Continued)

(52) U.S. Cl.
CPC ............... *G01V 1/50* (2013.01); *G01V 1/46* (2013.01); *G06N 5/022* (2013.01); *G06N 5/025* (2013.01)

(58) Field of Classification Search
None
See application file for complete search history.

(56) References Cited

U.S. PATENT DOCUMENTS

| 10,167,713 B2 | 1/2019 | Ma et al. |
| 2013/0191081 A1 | 7/2013 | Jain et al. |

(Continued)

FOREIGN PATENT DOCUMENTS

| WO | 2016058948 | 4/2016 |
| WO | 2020028305 A1 | 2/2020 |
| WO | 2020028310 A1 | 2/2020 |

OTHER PUBLICATIONS

D'Angelo, John James, Ashok, Pradeepkumar, and Eric van Oort. "Improved Geosteering Information and Data Transfer using an Automated Computational Framework." Paper presented at the SPE/IADC International Drilling Conference and Exhibition, Virtual, Mar. 2021 (Year: 2021).*

(Continued)

*Primary Examiner* — Lina Cordero
(74) *Attorney, Agent, or Firm* — DeLizio, Peacock, Lewin & Guerra LLP (57) ABSTRACT

A geosteering subsystem has been designed to detect patterns in measurements that correlate to geological events and use statical analysis to interpret the geological events corresponding to control points and update a geological model based on the statistical analysis-based interpretations. The subsystem evaluates obtained measurements against predetermined patterns that correlate to geological events. If a pattern is detected, the subsystem labels the corresponding wellbore position and/or measurements as a control point and passes on the measurements for interpretation. The subsystem generates interpretations of the control point based on the measurements and historic control points. For each interpretation, the subsystem generates a pseudo log based on offset logs. The subsystem then generates a posterior probability for each interpretation based on evaluating the corresponding pseudo log with respect to the measurements and formation knowledge. High posterior probability interpretations are selected for updating the geological model.

20 Claims, 5 Drawing Sheets

(51) Int. Cl.
*G06N 5/022* (2023.01)
*G06N 5/025* (2023.01)

(56) References Cited

U.S. PATENT DOCUMENTS

| | | |
|---|---|---|
| 2016/0124113 A1 | 5/2016 | Bi et al. |
| 2017/0285221 A1 | 10/2017 | Kayode et al. |
| 2020/0095849 A1 | 3/2020 | Demirer et al. |
| 2020/0109618 A1* | 4/2020 | Flanagan ............... E21B 7/10 |
| 2020/0340350 A1 | 10/2020 | Denisenko et al. |
| 2021/0278559 A1* | 9/2021 | Kastenbaum .......... E21B 47/12 |
| 2021/0333433 A1 | 10/2021 | Yarus et al. |

OTHER PUBLICATIONS

Fierstien, John, Winkler, Hugh, Strauss, Phillip, and Alexander Klokov. "Optimization and Drilling of Horizontal Wells Using a Bayesian Network." Paper presented at the SPE/AAPG/SEG Unconventional Resources Technology Conference, Houston, Texas, USA, Jul. 2018 (Year: 2018).*

"SA Application No. 123441251, First Substantive Examination Report", Oct. 18, 2023, 4 pages.

"PCT Application No. PCT/US2022/078243, International Search Report and Written Opinion", Jan. 31, 2023, 10 pages.

* cited by examiner

GEOSTEERING INTERPRETATION USING BAYESIAN INFERENCE

BACKGROUND

The disclosure generally relates to the field of electric digital data processing (e.g., CPC class G06F). The disclosure also relates to earth drilling (e.g., CPC class E21).

When drilling a wellbore directionally through a geologic formation, geosteering may be required to keep the wellbore within the target zone. Horizontal wellbores are drilled to increase the wellbore exposure to a target formation. To ensure the wellbore stays within the target zone, geosteering is utilized to determine the boundary depths of the target formation and steer the drill string to avoid penetrating the target zone boundaries. Geosteering uses sensor readings of formation properties, such as emitted gamma rays and resistivity, to assist in determining wellbore position. Geosteering operations will adjust steering to return the wellbore trajectory back within the target zone based on control points detected within the sensor readings.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody embodiments of the disclosure. However, it is understood that this disclosure may be practiced without these specific details. For instance, this disclosure refers to identifying a potential control point and automatically interpreting the control point to update a geological model in illustrative examples. Aspects of this disclosure can be also applied to identifying a potential control point and manually interpreting the control point to update a geological model. In other instances, well-known instruction instances, protocols, structures, and techniques have not been shown in detail in order not to obfuscate the description.

Overview

Geosteering operations utilize logging while drilling (LWD) measurements to evaluate and interpret the formation(s) being drilled. A geologist or a directional driller may monitor LWD measurements in (quasi) real time to identify geologic events that indicate the wellbore may be approaching a target zone boundary. A location corresponding to a geological event may be a control point (i.e., a point at which a geological model is modified/adjusted). A geologist can identify control points by identifying specific patterns in the LWD measurements, and then manually interpret that control point using LWD measurements and knowledge of the formation. However, interpretation by a human can introduce errors. If a control point is missed or misinterpreted, an incorrect steering decision could be made.

A geological control point detection and interpretation system ("geosteering subsystem") has been designed to detect patterns in measurements that correlate to geological events and use statical analysis to interpret the geological events corresponding to control points and update a geological model based on the statistical analysis-based interpretations. Domain knowledge, such as geological and formation knowledge, is used to specify patterns in formation measurements that correlate to geological events that likely correspond to control points. While drilling, the geosteering subsystem evaluates obtained measurements (e.g., logging while drilling (LWD) measurements) against the patterns. If a pattern is detected, the geosteering subsystem labels the corresponding wellbore position and/or measurements as a control point and passes on the measurements for interpretation. The geosteering subsystem generates interpretations of the control point based on the measurements and historic control points. For each interpretation, the geosteering subsystem generates a pseudo log based on offset logs. The geosteering subsystem then generates a posterior probability for each interpretation based on evaluating the corresponding pseudo log with respect to the measurements and formation knowledge. With the posterior probabilities, the geosteering subsystem resamples the interpretations and selects those with the highest posterior probability for updating the geological model.

Example Illustrations

Figure 1:
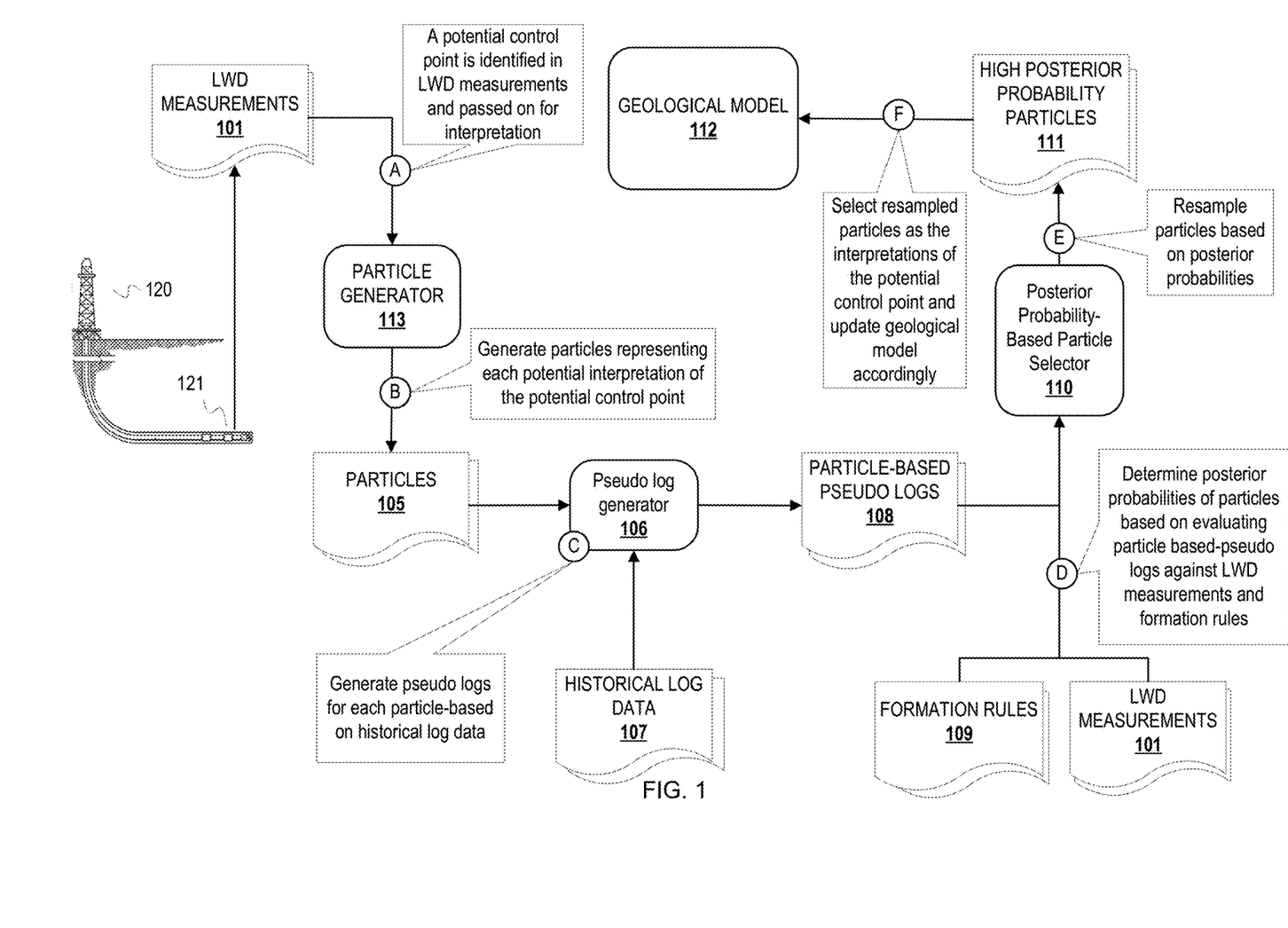
FIG. 1 is a conceptual diagram of a control point interpretation system that automatically interprets geological events based on formation measurements.

FIG. 1 is a conceptual diagram of a control point interpretation system that automatically interprets geological events based on formation measurements. The control point interpretation system illustrated in FIG. 1 includes a particle generator 113, pseudo log generator 106, and a posterior probability-based particle selector 110. One or more of these components may be implemented as a distinct method/function, library file(s), a subroutine of a monolithic program, etc. The disclosed system can be implemented with different architectures and/or program organization. The particle generator 113 generates "particles" for a detected control point. A particle is a set of data or populated data structure for a potential geological interpretation of the control point. The pseudo log generator 106 generates pseudo logs for the particles. The posterior probability-based particle selector 110 determines posterior probabilities for generated particles based on evaluation of the corresponding pseudo logs and selects a subset of the particles for updating a geological model 112

FIG. 1 is annotated with a series of letters A-F. These letters represent stages of operations, each of which can be one or multiple operations. Although these stages are ordered for this example, the stages illustrate one example to aid in understanding this disclosure and should not be used to limit the claims. Subject matter falling within the scope of the claims can vary with respect to the order of some operations.

At stage A, a potential control point is identified in LWD measurements 101 and passed on for interpretation. Logging while drilling (LWD) measurements 101 can be obtained from various sensors on drilling bottom hole assembly (BHA) 121 of drilling system 120 or from sensors/instruments on surface of drilling system 120. Specific patterns within LWD measurements 101 that match one or more predetermined patterns may be identified as a geological event, and the corresponding wellbore position measurements are labeled as a potential control point. The potential control point is passed on for further interpretation. Various methods can be utilized to detect patterns in LWD measurements such as manual detection by a human operator or automatic detection with a pattern detection algorithm.

At stage B, the particle generator 113 generates particles 105 for the control point. The particles 105 represent interpretations of the control point that are candidates for being used to update the geological model 112. A geological interpretation of a control point is a value or range of values of one or more variables that represent the geological event in terms of the wellbore trajectory and target formation, such as with wellbore position variables. Examples of the variables that may form an interpretation include wellbore measured depth, wellbore true vertical depth (TVD), target zone vertical depth, target zone dip angle, and wellbore inclination. To generate the particles, the particle generator 113 determines a distribution of values for each variable. The distribution may be continuous or discrete depending upon the variable. The particle generator 113 generates a particle with a discrete value or a subrange of a continuous distribution for each variable.

At stage C, the pseudo log generator 106 generates pseudo logs 108 based on the particles 105 and historical log data 107. The historical log data 107 is offset well log data that includes formation property measurements as a function of true vertical depth (TVD).

At stage D, the posterior probability-based particle selector 110 determines the posterior probabilities of the particles 105 based on evaluating the particle-based pseudo logs 108 against LWD measurements 101 and formation rules/knowledge 109. The posterior probability-based particle selector 110 evaluates the deviation between the formation property measurement of each of the particle-based pseudo logs 108 and a formation property measurement in the LWD measurements 101 corresponding to a same measured depth. The posterior probability-based particle selector 110 also evaluates each of the particle-based pseudo logs 108 against formation rules 109. The formation rules 109 are rules defined based on knowledge of the formation with respect to a formation property. For instance, a rule may specify a threshold rate of change for a pseudo log of gamma ray measurements. If a pseudo log does not comply with the rule, then a state (e.g., low confidence) value or flag is obtained. The amount of deviation from the LWD measurements and state obtained from evaluation against the formation rules 109 are used as inputs or parameters for calculating the posterior probability of the particle being an accurate interpretation.

At stage E, the posterior probability-based particle selector 110 resamples the particles 105 based on their respective posterior probability. Resampling the particles 105 will identify high posterior probability particles 111 that can be used to update the geological model 112. A high posterior probability may represent the level of accuracy that the interpretation represented by the particle have with respect to the actual values of the formation at the control point.

At stage F, the posterior probability-based particle selector 110 selects the high posterior probability particles 111 as the accurate interpretation(s) of the control point. The geological model 112 is then updated with the new control point. Geological model 112 can be updated using appropriate interpolation methods to generate a continuous geological model that can be used for steering decisions. For example, if a previous interpreted control point in the geological model 112 indicates a target formation top depth of 10,000 ft (TVD) and the interpreted control point indicates a target formation top depth of 10,500 ft (TVD), the top depths in between the two control points can be interpolated to generate a geological model.

Figure 2:
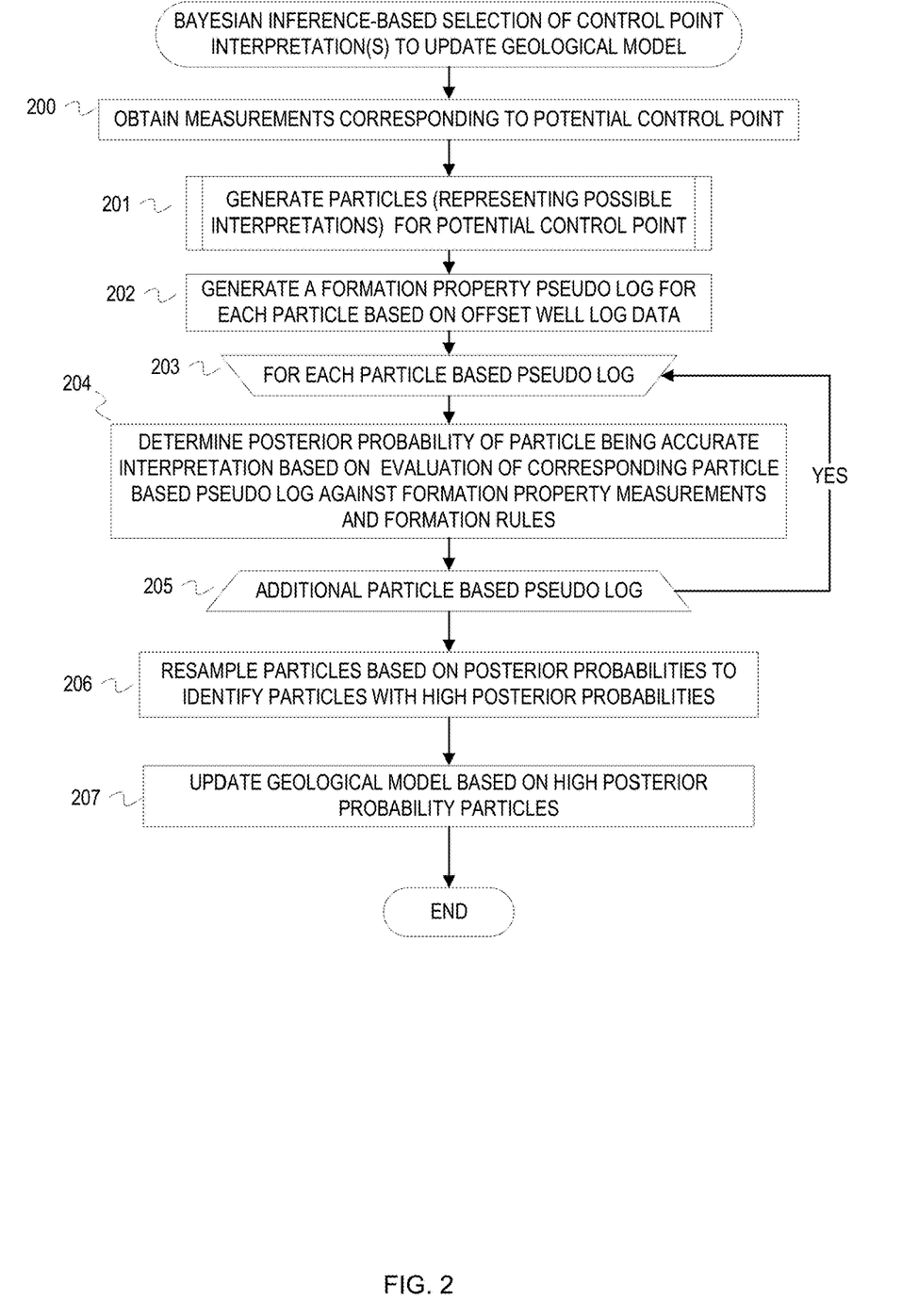
FIG. 2 is a flowchart example of operations for Bayesian inference-based selection of a control point interpretation(s) to update a geological model.
Figure 3:
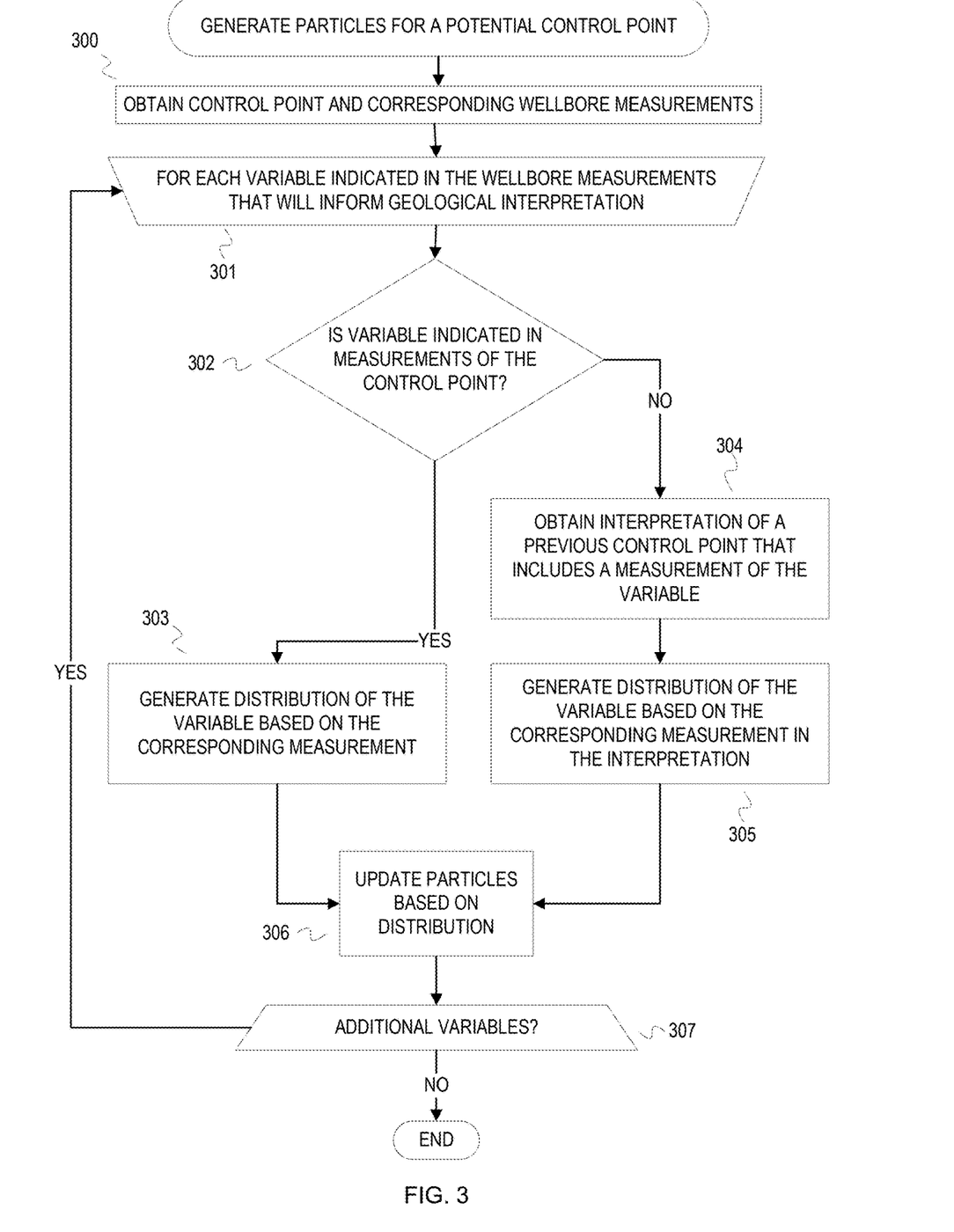
FIG. 3 is a flowchart example of operations to generate particles for a potential control point.

The following FIGS. 2 and 3 depict flowcharts for various aspects of the disclosed system. FIG. 2 is a flowchart of example operations for Bayesian statistics-based selection of control point interpretation(s) that includes particle generation, and FIG. 3 is a flowchart of example operations for generating the particles. The descriptions for these flowcharts refer to a control point detector, a control point detection module and a particle generator. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 2 is a flowchart example of operations for Bayesian inference-based selection of a control point interpretation(s) to update a geological model. The example operations in FIG. 2 are described with reference to a control point detection module.

At block 200, the control point detection module obtains measurements corresponding to a potential control point. The measurements corresponding to the control point are referenced by or associated with the control point. For example, a control point data structure can include the measurements or include a reference to the measurements (e.g., a pointer to another data structure, a memory address, an index into a database, etc.). The measurements corresponding to the control point can include wellbore position measurements such as wellbore measured depth and wellbore TVD. For example, if a control point is identified in gamma ray measurements at 8,000 ft TVD, then the TVD of 8,000 ft TVD and the corresponding gamma ray measurement will be obtained. The potential control point may be detected by human operators or by different methods such as measurement pattern detection.

At block 201, the control point detection module generates particles (representing possible interpretations) for the control point. Since an interpretation likely relies on a set of multiple wellbore variables, a particle will be generated for different instances of the variable set. The control point detection module may generate thousands of variables depending upon compute resources, preferences, and/or magnitude of the state-space of the variable set. Generation of particles will be described with example operations in FIG. 3.

At block 202, the control point detection module generates a formation property pseudo log for each particle based on offset well log data. As mentioned earlier, program code will select the measurement at the corresponding TVD of the offset well log data to create a pseudo log for a particle. The pseudo log can be generated from an empirical model that can be developed based on offset well log data or historical LWD measurements in the current wellbore. The pseudo log can also be generated from a physical based model, which considers the formation properties of the target formation.

At block 203, the control point detection module begins processing each particle-based pseudo log to determine posterior probabilities for the corresponding particles (i.e., potential interpretations).

At block 204, the control point detection module determines the posterior probability of each particle being an accurate interpretation based on the evaluation of the corresponding particle-based pseudo log against formation property measurements and formation rules. The control point detection module evaluates the pseudo log by determining the deviations between the formation property estimates of the pseudo log and the corresponding (by depth) formation property measurements in the wellbore measurements. For example, if a pseudo log has an estimated gamma ray reading of 55 API units at a depth of 10,000 ft and the gamma ray reading indicated in the wellbore measurements is 50 API at a depth of (approximately) 10,000 ft, the deviation is 5 API. A deviation value can be determined and assigned to each particle by aggregating the deviations (e.g., average) between the corresponding pseudo log and the wellbore measurements. Other statistics-based cleaning of the deviations can be done (e.g., discarding a deviation outside of a defined boundary of deviation). Each particle can then be evaluated with formation rules. Evaluation rules can be defined based on prior formation knowledge such as previously interpreted control points, seismic imaging, formation homogeneity and isotropy, etc. The rules can be programmatically represented with conditions and thresholds. If a pseudo log complies with the rules, then posterior probability parameter for the particle can be set accordingly. For instance, the control point detection module can compare the current pseudo log deviation value to a prior pseudo log deviation value. If seismic imaging indicates no faults in between the two control points and the deviation values between the two points are favorable with respect to the predicted formation dip angle, then the control point detection module can set the posterior probability parameter with an indication of accurate (e.g., a binary value) or an accuracy confidence value. Formation rules can be a general binary result. For example, if the particle complies with the formation rules, then the particle can be labeled with "yes", otherwise it can be labeled with "no".

The control point detection module determines the posterior probability based on the particle deviation value and a value resulting from evaluation of the particle against the formation rules utilizing Bayesian statistics. The posterior probability of a particle can be considered the probability that the particle represents an accurate or highly accurate interpretation of the control points. Parameters used in calculating the posterior probability of a particle include the deviation value(s) and a value corresponding to an evaluation result of each formation rule. For example, it can be assumed the bias between the particle-based pseudo log and formation property measurements follows a normal distribution. The posterior probability can be calculated from the probability density function (pdf)p=pdf(e), where p represents the posterior probability and e represents the bias for each particle. Similarly, we can assume the spatial continuity of the formation follows a normal distribution, and posterior probability can be calculated by pdf(e), where e represents the deviation from the last control point (i.e., measure of the discontinuity).

At block 205, the control point detection module determines if there is an additional particle-based pseudo log to process. If so, operational flow returns to block 203. Otherwise, operational flow proceeds to block 206.

At block 206, the control point detection module resamples the particles to identify the particles with high posterior probabilities. Resampling can be according to any of various resampling methods. Example resampling methods that could be used include roulette wheel resampling and low-variance resampling. The resampling yields a more densely clustered set of particles considered high posterior probability particles because they reside within a high-probability region. In some instances, the quality of the particles can be quantified by the size of the resampled particles. A large variance on the resampled particles may mean the interpretations have low confidence level. A low variance may mean the interpretations have a high confidence level. Therefore, a limit on the variance may be set to define the high probability region. Resampling helps to avoid issues, such as particle depletion.

At block 207, the control point detection module updates the geological model based on the high posterior probability particles. The particles with high posterior probabilities represent interpretations with the highest probability of being accurate interpretations of the control points. The control point detection module selects the interpretation(s) represented by the high posterior probability particles to update the geological model. The geological model can be updated using various interpolation methods including linear interpolation, spline interpolation, and Hermite interpolation. Interpolating variables of the geological model based on the selected and indicating the control point in the geological model generates a geological model with the new control point and continuous variable values that can be used to make steering decisions in geosteering operations.

FIG. 3 is a flowchart example of operations to generate particles for a potential control point. The description uses particles as representations of potential interpretations since the disclosed system generates interpretations based on statistical inference. An interpretation is considered a stochastic process that models a wellbore trajectory through a formation. Thus, the generated potential interpretations collectively represent a prior distribution of an accurate interpretation of the control point given the available wellbore measurements. The example operations in FIG. 3 are described with reference to a particle generator for consistency with FIG. 1.

At block 300, the particle generator obtains a control point and the corresponding wellbore measurements. The control point indicates wellbore position measurements at a depth at which a geological event pattern has been detected, as mentioned earlier. The corresponding wellbore measurements include measurements of wellbore position variables (e.g., wellbore inclination, wellbore measured depth, and wellbore TVD). The corresponding measurements may also include formation property measurements at the depth of the control point.

At block 301, the particle generator processes each variable indicated in the wellbore measurements that will inform the geological interpretation. The wellbore measurements may include a variable that does not inform interpretation, which can be ignored by the particle generator. The variables that inform interpretation of a control point are specified or defined in advance based on domain knowledge of formations in general and/or the target formation. For example, a geologist can list the interpretation variables in a file accessible by the particle generator. The particle generator can traverse the listing of variables.

At block 302, the particle generator determines if the variable is indicated in the wellbore measurements corresponding to the control point (e.g., measurements taken by a drilling BHA at a current position). A variable may not be indicated in the wellbore measurements of the current control point because some variables are measured at different intervals. If the variable is indicated in the wellbore measurements of the current control point, then operational flow proceeds to block 303. Otherwise, operational flow proceeds to block 304.

At block 303, the particle generator generates a distribution of the variable based on the corresponding measurement. The particle generator can determine the distribution of the variable as a normal/Gaussian distribution or truncated/nontruncated distribution around the corresponding measurement. For example, if the wellbore TVD is available in the current measurements, then a range of variables can be normally distributed around the current measurements of wellbore TVD. The distribution of variables generated can be a discrete or a sub range of continuous measurements depending on the variable. Methods to acquire parameters of the distribution (e.g., mean and standard distribution) include, but are not limited to, manually determining parameters with a human operation and estimating parameters based on historical data.

At block 304, the particle generator obtains an interpretation of a previous control point that includes a measurement of the variable. The previous control point does not have to be the prior control point. An interpretation of a previous control point at any depth can be used. Depending upon organization and encoding of measurements, the particle generator can search previous control points for the variable by variable name.

At block 305, the particle generator generates a distribution of the variable based on the corresponding measurement in the obtained interpretation. Similar to block 303, the particle generator can determine a normal distribution with respect to the obtained measurement from the previous control point and the distribution can be continuous or a distribution of discrete values.

At block 306, the particle generator updates the particles based on the generator distribution (either at block 303 or 305). Updating particles can be done according to different techniques. The particle generator may assign values or subranges of the variable from the distribution in a predetermined order to the particles. The particle generator may quasi-randomly or randomly assign values or subranges to the particles. If subranges are being assigned, then the particle generator can determine equal subranges or vary subranges.

At block 307, the particle generator determines if there is an additional variable for processing. If so, operational flow returns to block 301. Otherwise, the particle generator has completed generating particles.

Figure 4:
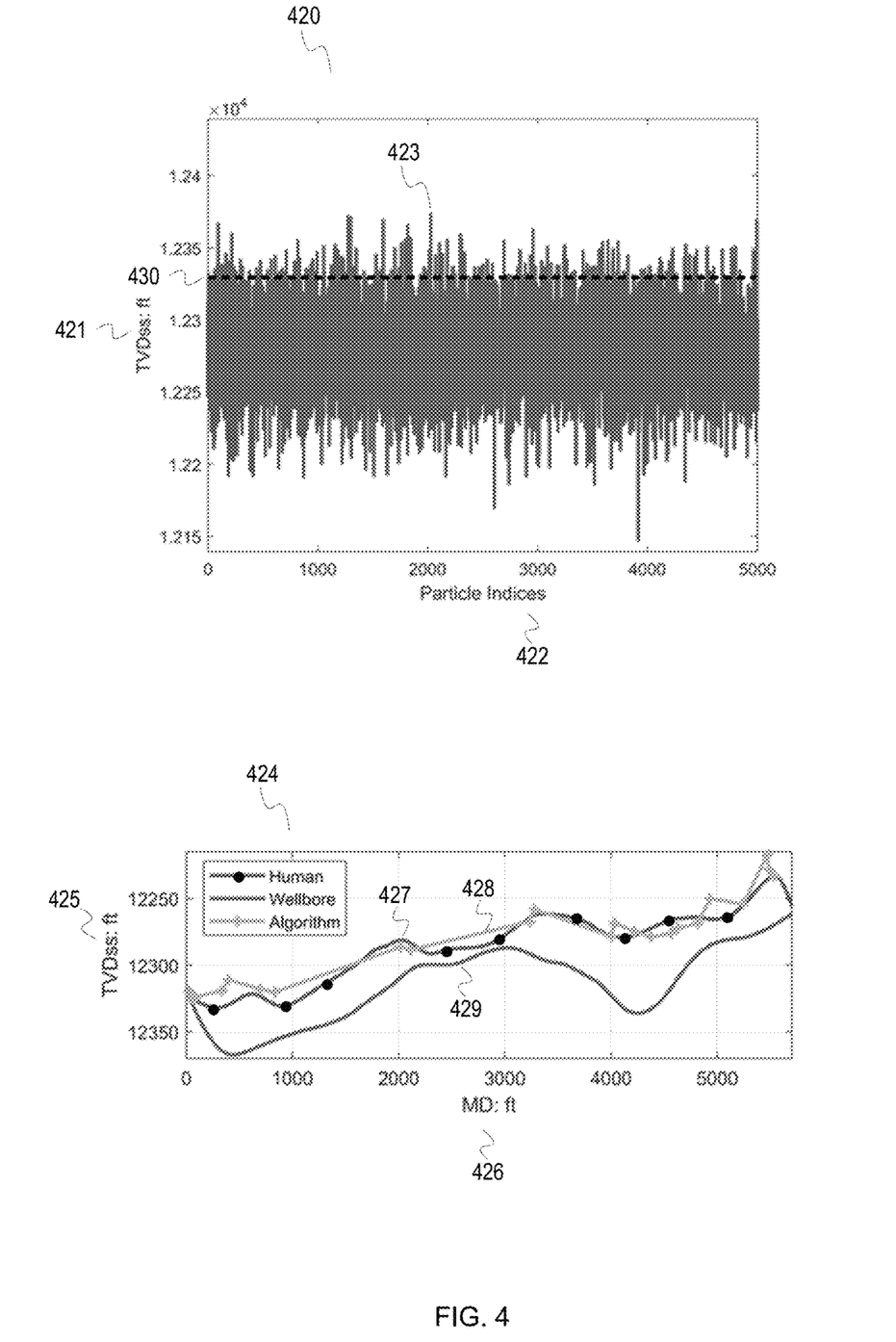
FIG. 4 illustrates examples of particle generation and resampling and an example geological model profile.

FIG. 4 illustrates examples of particle generation and resampling and an example geological model profile. Particle profile 420 depicts generated particles for a potential control point that has been detected in LWD measurements. The x-axis 422 comprises the particle indices and the y-axis 421 comprises the interpreted true vertical depth subsea (TVDss) of the control point in feet. In this example illustration, 5,000 particles 423 have been generated for the control point. The particles 423 may be evaluated based on the deviation between the LWD measurements and the particle-based pseudo log(s), and formation knowledge. In some instances, particles 423 may be resampled to identify the particles with high posterior probabilities to represent the best interpretation of the control point. After resampling of the particles 423, resampled particles 430 are identified as particles with high posterior probability and will be used as the most accurate interpretation of the control point. The interpretation may then be added to a geological model as a new control point.

Geological model profile 424 depicts control points that have been interpreted by various methods and linearly interpolated to generate continuous geological models in a measured depth (MD)/true vertical depth (TVD) domain. Other methods of interpolation may be used to generate continuous geological models. The x-axis 426 comprises the measured depth (MD) in feet. The y-axis 425 comprises the true vertical depth subsea (TVDss) in feet. Geological model profile 424 comprises a human-interpreted continuous geological model 427 and an algorithm-interpreted continuous geological model 428. Both models 427, 428 comprise control points that have been interpreted by a human and an algorithm, respectively, and plotted at their corresponding MD and TVD. In the example illustration, linear interpolation is used to generate a continuous geological model for each set of interpreted control points. The algorithm used to interpret the control points may include methods comprising Bayesian statistics. Wellbore profile 429 is the actual MD and TVD position points of the wellbore as it is drilled through a geological formation(s), for comparison to the continuous geological models. Wellbore position points MD and TVD may be obtained from measurements generated by tools on a drilling bottom hole assembly to generate wellbore profile 429.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus. As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 5:
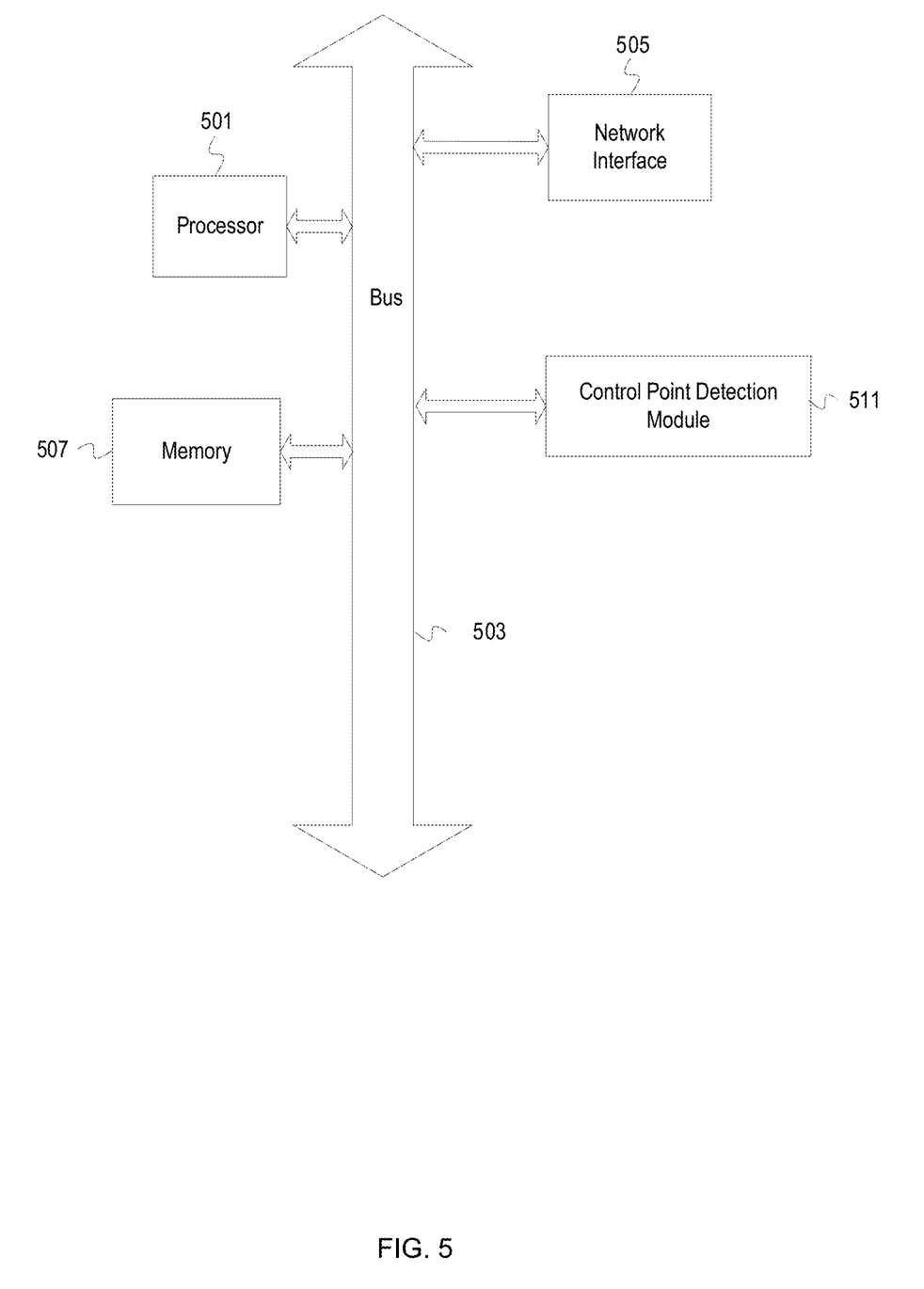
FIG. 5 depicts an example computer system with a control point detection module update a geological model with control points.

FIG. 5 depicts an example computer system with a control point detection module to update a geological model with control points. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes control point detection module 511. The control point detection module 511 interprets potential control points with Bayesian inference for updating a geological model. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

While the aspects of the disclosure are described with reference to various implementations and exploitations, it will be understood that these aspects are illustrative and that the scope of the claims is not limited to them. In general, techniques for identifying and interpreting control points as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Use of the phrase "at least one of" preceding a list with the conjunction "or" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Embodiment 1: A method comprising: based on indication of a control point during propagation of a wellbore trajectory through a formation, generating a plurality of interpretations of the control point based, at least in part, on wellbore measurements corresponding to the control point; for each of the plurality of interpretations, generating a pseudo log based, at least in part, on the interpretation and historical well data; and determining posterior probabilities for the plurality of interpretations based, at least in part, on evaluation of the pseudo logs against historical formation property measurements and a set of one or more rules based on knowledge of the formation; and updating a geological model to indicate the control point and with at least a subset of the plurality of interpretations based, at least in part, on the posterior probabilities.

Embodiment 2: The method of Embodiment 1 further comprising resampling the plurality of interpretations to determine which of the interpretations are high posterior probability interpretations, wherein updating the geological model with at least a subset of the plurality of interpretations based, at least in part, on the posterior probabilities comprises updating the geological model with a subset of the interpretations that are high posterior probability interpretations.

Embodiment 3: The method of Embodiment 1, wherein updating the geological model with at least a subset of the plurality of interpretations comprises updating the model with interpolations of at least a subset of variables indicated in the subset of interpretations.

Embodiment 4: The method of Embodiment 1, wherein determining posterior probabilities for the interpretations based, at least in part, on evaluation of the pseudo logs against historical formation property measurements and the set of one or more rules based on knowledge of the formation comprises determining deviations between the pseudo logs and the historical formation property measurements and compliance of the pseudo logs with the set of one or more rules, wherein determining the posterior probabilities is based on the deviations and the determinations of compliance.

Embodiment 5: The method of Embodiment 1, wherein generating the plurality of interpretations of the control point comprises: determining a set of variables specified as forming an interpretation; generating distributions of values for each of the variables; and updating the interpretations based on the distributions.

Embodiment 6: The method of Embodiment 5, wherein generating the distributions for each of the set of variables comprises: for each of the set of variables, determining whether the wellbore measurements corresponding to the control point include a set of one or more measurements for the variable; based on determining that the wellbore measurements include the set of one or more measurements for the variable, generating a distribution of values for the variable based on the set of one or more measurements for the variable; and based on determining that the wellbore measurements do include the set of one or more measurements for the variable, generating a distribution of values for the variable based on the set of one or more measurements for the variable from wellbore measurements corresponding to a previous control point.

Embodiment 7: The method of Embodiment 1, wherein the historical well data comprises well log data of at least one offset well and well log data of the wellbore that has been drilled in the formation.

Embodiment 8: The method of Embodiment 1, wherein the pseudo log generates a formation property value for each of the plurality of interpretations based, at least in part, on the corresponding formation property measurements of the historical well data.

Embodiment 9: The method of Embodiment 1, wherein the wellbore measurements corresponding to the control point comprise wellbore position measurements.

Embodiment 10: The method of Embodiment 9, wherein the wellbore measurements corresponding to the control point further comprise formation property measurements.

Embodiment 11: A non-transitory, computer-readable medium having program code stored thereon, the program code comprising instructions to: based on indication of a control point during propagation of a wellbore trajectory through a formation, generate a plurality of interpretations of the control point based, at least in part, on wellbore measurements corresponding to the control point; for each of the plurality of interpretations, generate a pseudo log based, at least in part, on the interpretation and historical well data; and determine posterior probabilities for the plurality of interpretations based, at least in part, on evaluation of the pseudo logs against historical formation property measurements and a set of one or more rules based on knowledge of the formation; and update a geological model to indicate the control point and with at least a subset of the plurality of interpretations based, at least in part, on the posterior probabilities.

Embodiment 12: The non-transitory, computer-readable medium of Embodiment 11, wherein the program code further comprises instructions to resample the plurality of interpretations to determine which of the interpretations are high posterior probability interpretations, wherein the instructions to update the geological model with at least a subset of the plurality of interpretations based, at least in part, on the posterior probabilities comprise instructions to update the geological model with a subset of the interpretations that are high posterior probability interpretations.

Embodiment 13: The non-transitory, computer-readable medium of Embodiment 11, wherein the instructions to update the geological model with at least a subset of the plurality of interpretations comprise instructions to update the model with interpolations of at least a subset of variables indicated in the subset of interpretations.

Embodiment 14: The non-transitory, computer-readable medium of Embodiment 11, wherein the instructions to determine posterior probabilities for the interpretations based, at least in part, on evaluation of the pseudo logs against historical formation property measurements and the set of one or more rules based on knowledge of the formation comprise instructions to determine deviations between the pseudo logs and the historical formation property measurements and compliance of the pseudo logs with the set of one or more rules, wherein the instructions to determine the posterior probabilities comprise instructions to determine the posterior probabilities based on the deviations and the determinations of compliance.

Embodiment 15: The non-transitory, computer-readable medium of Embodiment 11, wherein the instructions to generate the plurality of interpretations of the control point comprise instructions to: determine a set of variables specified as forming an interpretation; generate distributions of values for each of the variables; and update the interpretations based on the distributions.

Embodiment 16: The non-transitory, computer-readable medium of Embodiment 15, wherein the instructions to generate the distributions for each of the set of variables comprises instructions to: for each of the set of variables, determine whether the wellbore measurements corresponding to the control point include a set of one or more measurements for the variable; based on a determination that the wellbore measurements include the set of one or more measurements for the variable, generating a distribution of values for the variable based on the set of one or more measurements for the variable; and based on a determination that the wellbore measurements do include the set of one or more measurements for the variable, generating a distribution of values for the variable based on the set of one or more measurements for the variable from wellbore measurements corresponding to a previous control point.

Embodiment 17: An apparatus comprising: a processor; and a computer-readable medium having instructions stored thereon that are executable by the processor to cause the apparatus to, based on indication of a control point during propagation of a wellbore trajectory through a formation, generate a plurality of interpretations of the control point based, at least in part, on wellbore measurements corresponding to the control point; for each of the plurality of interpretations, generate a pseudo log based, at least in part, on the interpretation and historical well data; and determine posterior probabilities for the plurality of interpretations based, at least in part, on evaluation of the pseudo logs against historical formation property measurements and a set of one or more rules based on knowledge of the formation; and update a geological model to indicate the control point and with at least a subset of the plurality of interpretations based, at least in part, on the posterior probabilities.

Embodiment 18: The apparatus of Embodiment 17, wherein the computer-readable medium further has stored thereon instructions executable by the processor to cause the apparatus to resample the plurality of interpretations to determine which of the interpretations are high posterior probability interpretations, wherein the instructions to update the geological model with at least a subset of the plurality of interpretations based, at least in part, on the posterior probabilities comprise instructions executable by the processor to cause the apparatus to update the geological model with a subset of the interpretations that are high posterior probability interpretations.

Embodiment 19: The apparatus of Embodiment 17, wherein the instructions to update the geological model with at least a subset of the plurality of interpretations comprise the instructions being executable by the processor to cause the apparatus to update the model with interpolations of at least a subset of variables indicated in the subset of interpretations.

Embodiment 20: The apparatus of Embodiment 17, wherein the instructions to determine posterior probabilities for the interpretations based, at least in part, on evaluation of the pseudo logs against historical formation property measurements and the set of one or more rules based on knowledge of the formation comprise instructions executable by the processor to cause the apparatus to determine deviations between the pseudo logs and the historical formation property measurements and compliance of the pseudo logs with the set of one or more rules, wherein the instructions to determine the posterior probabilities comprise the instructions being executable to determine the posterior probabilities based on the deviations and the determinations of compliance.

The invention claimed is:

1. A method comprising:
based on indication of a control point during propagation of a wellbore trajectory, via a bottom hole assembly through a formation:
generating, via a particle generator, a plurality of interpretations of the control point based, at least in part, on wellbore measurements corresponding to the control point;
for each interpretation of the plurality of interpretations, generating, via a pseudo log generator, a pseudo log based, at least in part, on the interpretation and historical well data;
determining posterior probabilities for the plurality of interpretations based, at least in part, on evaluation of pseudo logs against historical formation property measurements and a set of one or more rules based on knowledge of the formation;
updating a geological model to indicate the control point and with at least a subset of the plurality of interpretations based, at least in part, on the posterior probabilities; and
performing a geosteering operation based on the updated geological model.

2. The method of claim 1 further comprising resampling the plurality of interpretations to determine which of the plurality of interpretations are high posterior probability interpretations, wherein the high posterior probability interpretations correspond to the plurality of interpretations exceeding a confidence threshold, and wherein updating the geological model with at least the subset of the plurality of interpretations based, at least in part, on the posterior probabilities comprises updating the geological model with the subset of the plurality of interpretations that are the high posterior probability interpretations.

3. The method of claim 1, wherein updating the geological model with at least the subset of the plurality of interpretations comprises updating the geological model with interpolations of at least a subset of variables indicated in the subset of the plurality of interpretations.

4. The method of claim 1, wherein determining the posterior probabilities for the plurality of interpretations based, at least in part, on the evaluation of the pseudo logs against the historical formation property measurements and the set of one or more rules based on the knowledge of the formation comprises determining deviations between the pseudo logs and the historical formation property measurements and compliance of the pseudo logs with the set of one or more rules, wherein determining the posterior probabilities is based on the deviations and the determinations of compliance.

5. The method of claim 1, wherein generating the plurality of interpretations of the control point comprises:
determining a set of variables specified as forming the interpretation;
generating distributions of values for each variable of the set of variables; and
updating the interpretation based on the distributions of values.

6. The method of claim 5, wherein generating the distributions of values for each variable of the set of variables comprises:
for each variable of the set of variables:
determining whether the wellbore measurements corresponding to the control point include a set of one or more measurements for the variable;
based on determining that the wellbore measurements include the set of one or more measurements for the variable, generating a distribution of values for the variable based on the set of one or more measurements for the variable; and
based on determining that the wellbore measurements do not include the set of one or more measurements for the variable, generating the distribution of values for the variable based on the set of one or more measurements for the variable from wellbore measurements corresponding to a previous control point.

7. The method of claim 1, wherein the historical well data comprises well log data of at least one offset well and well log data of a wellbore that has been drilled in the formation.

8. The method of claim 1, wherein the pseudo log generates a formation property value for each of the plurality of interpretations based, at least in part, on corresponding formation property measurements of the historical well data.

9. The method of claim 1, wherein the wellbore measurements corresponding to the control point comprise wellbore position measurements.

10. The method of claim 9, wherein the wellbore measurements corresponding to the control point further comprise formation property measurements.

11. A non-transitory, computer-readable medium having program code stored thereon, the program code comprising instructions to:
based on indication of a control point during propagation of a wellbore trajectory, via a bottom hole assembly through a formation:
generate, via a particle generator, a plurality of interpretations of the control point based, at least in part, on wellbore measurements corresponding to the control point;
for each interpretation of the plurality of interpretations, generate, via a pseudo log generator, a pseudo log based, at least in part, on the interpretation and historical well data;
determine posterior probabilities for the plurality of interpretations based, at least in part, on evaluation of pseudo logs against historical formation property measurements and a set of one or more rules based on knowledge of the formation;
update a geological model to indicate the control point and with at least a subset of the plurality of interpretations based, at least in part, on the posterior probabilities; and
perform a geosteering operation based on the updated geological model.

12. The non-transitory, computer-readable medium of claim 11, wherein the program code further comprises instructions to resample the plurality of interpretations to determine which of the plurality of interpretations are high posterior probability interpretations, wherein the high posterior probability interpretations correspond to the plurality of interpretations exceeding a confidence threshold, and wherein the instructions to update the geological model with at least the subset of the plurality of interpretations based, at least in part, on the posterior probabilities comprise instructions to update the geological model with the subset of the plurality of interpretations that are the high posterior probability interpretations.

13. The non-transitory, computer-readable medium of claim 11, wherein the instructions to update the geological model with at least the subset of the plurality of interpretations comprise instructions to update the geological model with interpolations of at least a subset of variables indicated in the subset of the plurality of interpretations.

14. The non-transitory, computer-readable medium of claim 11, wherein the instructions to determine the posterior probabilities for the plurality of interpretations based, at least in part, on the evaluation of the pseudo logs against the historical formation property measurements and the set of one or more rules based on the knowledge of the formation comprise instructions to determine deviations between the pseudo logs and the historical formation property measurements and compliance of the pseudo logs with the set of one or more rules, wherein the instructions to determine the posterior probabilities comprise instructions to determine the posterior probabilities based on the deviations and the determinations of compliance.

15. The non-transitory, computer-readable medium of claim 11, wherein the instructions to generate the plurality of interpretations of the control point comprise instructions to:
determine a set of variables specified as forming the interpretation;
generate distributions of values for each variable of the set of variables; and
update the interpretation based on the distributions of values.

16. The non-transitory, computer-readable medium of claim 15, wherein the instructions to generate the distributions of values for each variable of the set of variables comprises instructions to:
for each variable of the set of variables:
determine whether the wellbore measurements corresponding to the control point include a set of one or more measurements for the variable;
based on a determination that the wellbore measurements include the set of one or more measurements for the variable, generate a distribution of values for the variable based on the set of one or more measurements for the variable; and
based on a determination that the wellbore measurements do not include the set of one or more measurements for the variable, generate the distribution of values for the variable based on the set of one or more measurements for the variable from wellbore measurements corresponding to a previous control point.

17. An apparatus comprising:
a processor; and
a non-transitory, computer-readable medium having instructions stored thereon that are executable by the processor to cause the apparatus to,
based on indication of a control point during propagation of a wellbore trajectory, via a bottom hole assembly through a formation:
generate, via a particle generator, a plurality of interpretations of the control point based, at least in part, on wellbore measurements corresponding to the control point;
for each interpretation of the plurality of interpretations, generate, via a pseudo log generator, a pseudo log based, at least in part, on the interpretation and historical well data; and
determine posterior probabilities for the plurality of interpretations based, at least in part, on evaluation of pseudo logs against historical formation property measurements and a set of one or more rules based on knowledge of the formation;
update a geological model to indicate the control point and with at least a subset of the plurality of interpretations based, at least in part, on the posterior probabilities; and
perform a geosteering operation based on the updated geological model.

18. The apparatus of claim 17, wherein the non-transitory, computer-readable medium further has stored thereon instructions executable by the processor to cause the apparatus to resample the plurality of interpretations to determine which of the plurality of interpretations are high posterior probability interpretations, wherein the high posterior probability interpretations correspond to the plurality of interpretations exceeding a confidence threshold, and wherein the instructions to update the geological model with at least the subset of the plurality of interpretations based, at least in part, on the posterior probabilities comprise instructions executable by the processor to cause the apparatus to update the geological model with the subset of the plurality of interpretations that are the high posterior probability interpretations.

19. The apparatus of claim 17, wherein the instructions to update the geological model with at least the subset of the plurality of interpretations comprise the instructions being executable by the processor to cause the apparatus to update the geological model with interpolations of at least a subset of variables indicated in the subset of the plurality of interpretations.

20. The apparatus of claim 17, wherein the instructions to determine the posterior probabilities for the plurality of interpretations based, at least in part, on the evaluation of the pseudo logs against the historical formation property measurements and the set of one or more rules based on the knowledge of the formation comprise instructions executable by the processor to cause the apparatus to determine deviations between the pseudo logs and the historical formation property measurements and compliance of the pseudo logs with the set of one or more rules, wherein the instructions to determine the posterior probabilities comprise the instructions being executable to determine the posterior probabilities based on the deviations and the determinations of compliance.

* * * * *